United States Patent
Welles, II et al.

(10) Patent No.: US 7,493,100 B2
(45) Date of Patent: Feb. 17, 2009

(54) COMPENSATING FOR DYNAMIC NULLS IN A POWER LINE COMMUNICATION SYSTEM

(75) Inventors: Kenneth Brakeley Welles, II, Scotia, NY (US); Douglas H. Marman, Ridgefield, WA (US)

(73) Assignee: General Electric Company, Niskayuna, NY (US)

( * ) Notice: Subject to any disclaimer, the term of this patent is extended or adjusted under 35 U.S.C. 154(b) by 848 days.

(21) Appl. No.: 10/685,868

(22) Filed: Oct. 15, 2003

(65) Prior Publication Data

US 2005/0085211 A1    Apr. 21, 2005

(51) Int. Cl.
*H04M 9/00* (2006.01)

(52) U.S. Cl. .................. 455/402; 455/14; 455/15; 455/16

(58) Field of Classification Search ................. 455/402, 455/14, 15, 16
See application file for complete search history.

(56) References Cited

U.S. PATENT DOCUMENTS

| | | | |
|---|---|---|---|
| 4,061,970 A * | 12/1977 | Magneron ................ | 455/14 |
| 4,479,215 A | 10/1984 | Baker | |
| 4,622,441 A * | 11/1986 | Martin ..................... | 379/345 |
| 4,622,535 A | 11/1986 | Ise et al. | |
| 4,866,704 A * | 9/1989 | Bergman .................. | 370/452 |
| 5,426,404 A * | 6/1995 | Kommrusch et al. ....... | 333/246 |
| 5,929,749 A * | 7/1999 | Slonim et al. .......... | 340/870.01 |
| 6,747,569 B2 * | 6/2004 | Hill et al. ................ | 340/855.8 |
| 2002/0080719 A1 * | 6/2002 | Parkvall et al. ........... | 370/235 |
| 2005/0007211 A1 * | 1/2005 | Harris ..................... | 333/125 |
| 2006/0246849 A1 * | 11/2006 | Tran ......................... | 455/77 |

FOREIGN PATENT DOCUMENTS

| | | |
|---|---|---|
| EP | 1475901 | 11/2004 |
| WO | WO 03069796 | 8/2003 |

OTHER PUBLICATIONS

L.T. Tang; "Characterization of Power Distribution Lines for High-Speed Data Transmission"; 2000 IEEE, no month listed.

* cited by examiner

*Primary Examiner*—Temica M Beamer
(74) *Attorney, Agent, or Firm*—Fletcher Yoder

(57) ABSTRACT

There is provided a method of facilitating communication in an electrical power network having a complex impedance. The method includes modifying the complex impedance, and determining whether the modifying affected a quality of the communication.

24 Claims, 5 Drawing Sheets

COMPENSATING FOR DYNAMIC NULLS IN A POWER LINE COMMUNICATION SYSTEM

BACKGROUND OF THE INVENTION

1. Field of the Invention

The present disclosure relates to power line communications, and more particularly, to a technique of dealing with frequency nulls in a power line communication system.

2. Description of the Related Art

In a power line communication (PLC) system, a communication signal propagates over wires of an electrical power network. PLC signaling is typically performed by superimposing a high frequency signal, e.g., a frequency greater than 20 KHz, on top of a power line voltage. An electrical outlet in the power network can serve as both a source of electrical power and a port for the communication signal. Thus, a PLC transceiver plugged into the electrical outlet receives both electrical power and the communication signal via the electrical outlet. Note however, that some PLC devices do not necessarily receive power from the power line, or at least do not depend on the power from the power line. Therefore, in a PLC system, the power line is used for communication purposes, and in some cases, communication can be conducted either when power is present or is not present.

A null is a frequency at which the communication signal is attenuated to an undesirable level. Communication frequencies are subject to nulls caused by standing wave destructive interference. If a deep null occurs at a PLC system carrier frequency, communication may fail.

The frequency at which signal null occurs is a function of a complex impedance of the electrical power network. The complex impedance is, in turn, influenced by a presence of electrical devices or appliances coupled to the electrical network. It is also influenced by the numerous branch wiring circuits, which can each create reflections and affect impedances at varying frequencies.

The PLC system may be implemented in a single structure such as a residence or a commercial building, or over a complex of such structures. Thus the PLC system is not inherently limited to any particular geographic locality, size or topology, and it may include electrical wiring between structures.

The complex impedance is also influenced by operation of electrical devices or appliances coupled to the electrical network. For example, turning on an electrical light may cause a change in the complex impedance, and thus a change in the null. Consequently, the depth and/or frequency of the null can change.

Some PLC devices are very narrow band devices. U.S. Pat. No. 6,441,723 describes a device that uses a single frequency with a very narrow bandwidth. Consequently, if a null occurs at the single frequency, the device may be rendered inoperable.

Several techniques have been employed in an attempt to circumvent problems caused by nulls. A first technique is to use a PLC signal having a relatively low frequency, and thus a relatively long wavelength, so that the PLC signal is not affected by standing waves. Devices based on lower frequencies display a number of problems. First, to effectively communicate from one phase of the power line to another phase they typically require an installation of a "phase bridge" to couple the signals across the phases. This adds significantly to the cost of the installations and complexity since phase bridges are not always easily installed by a homeowner. Second, there is much more noise from appliances at lower frequencies, thus reducing the signal-to-noise ratio, which affects the quality of the signals. Third, capacitors in appliances, such as are common in televisions, have been designed to reduce interference but also can attenuate the desired communication signals significantly. A second technique is to have a plurality of frequencies available for PLC signals, and if communication is not satisfactory at a first frequency, then switch to a second frequency. The second technique requires PLC devices to be capable of operating at all of the plurality of frequencies, and additionally requires a control protocol so that the devices tune to an appropriate frequency. Consequently, as compared to a system that uses a single frequency, the second technique requires additional hardware and a relatively complex control protocol. A third technique employs spread spectrum technology such that a narrow null attenuates only a small portion of the PLC signal, yet other portions of the PLC signal survive to provide satisfactory communication. The third technique requires the use of a matched filter or other special receiving hardware to properly receive a spread spectrum signal that has been modified by a specific frequency null. Consequently, as compared to a system that uses a single frequency, the third technique requires additional receiver hardware and/or software.

It is desirable to maintain a communication system that utilizes a single frequency, because, as compared to an agile frequency system, the single frequency system is generally less expensive, of less complex design, and more reliable since it has fewer components. Accordingly, there is a need for an improved technique for dealing with nulls that interfere with the operation of single frequency, power line communication devices.

SUMMARY OF THE INVENTION

There is provided a method of facilitating communication in an electrical power network having a complex impedance. In one aspect, the method includes modifying the complex impedance, and determining whether the modifying affected a quality of the communication. In another aspect, the method includes determining a quality of communication in the electrical power network, and modifying the complex impedance if the quality is below an acceptable threshold. In yet another aspect the method includes transmitting information via the electrical power network, modifying the complex impedance, and retransmitting the information via the electrical power network.

An embodiment of the present invention is an apparatus for facilitating communication in an electrical power network having a complex impedance. The apparatus includes a circuit for modifying the complex impedance, and a processor for determining whether the modifying affected a quality of the communication.

Another embodiment of the present invention is a processor for facilitating communication in an electrical power network having a complex impedance. In one aspect, the processor includes a module for determining a quality of communication in the electrical power network, and a module for controlling a circuit to modify the complex impedance if the quality is below an acceptable threshold. In another aspect, the processor includes a module for advising a transmitter to transmit information via the electrical power network, a module for controlling a circuit to modify the complex impedance, and a module for advising the transmitter to retransmit the information.

Another embodiment of the present invention is a storage medium that contains instructions for controlling a processor for facilitating communication in an electrical power network having a complex impedance. In one aspect, the storage medium includes instructions for controlling the processor to determine a quality of communication in the electrical power network, and instructions for controlling the processor to control a circuit to modify the complex impedance if the quality is below an acceptable threshold. In another aspect, the storage medium includes instructions for controlling the processor to advise a transmitter to transmit information via the electrical power network, instructions for controlling the processor to control a circuit to modify the complex impedance, and instructions for controlling the processor to advise the transmitter to retransmit the information.

DESCRIPTION OF THE INVENTION

Figure 1:
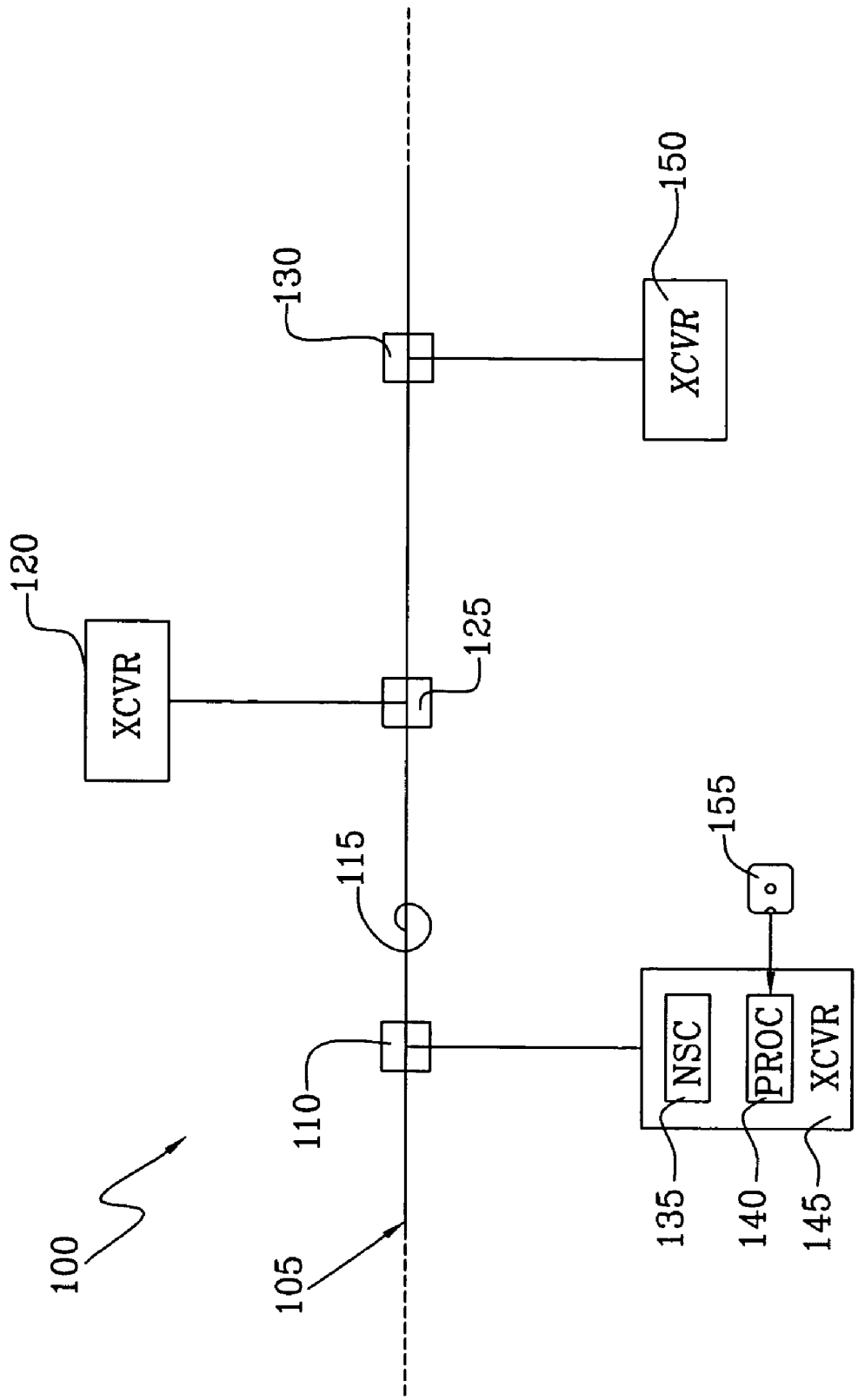
FIG. 1 is a schematic diagram of a PLC system implemented in an electrical power network.

FIG. 1 is a schematic diagram of a PLC system 100 implemented in an electrical power network 105, for example, a 120 volts alternating current (VAC) 60 hertz (Hz) electrical power network. Electrical power network 105 includes a power line 115 and a plurality of electrical outlets 110, 125 and 130. Although power line 115 is illustrated as a single line, in practice it includes a plurality of conductors, for example a hot line, a neutral line, and a ground line, usually with numerous wiring branches on a single circuit. PLC system 100 includes three transceivers 145, 120 and 150, which are connected to electrical power network 105 via electrical outlets 110, 125 and 130, respectively.

Each of transceivers 145, 120 and 150 have a transmitter and a receiver integrated therein, neither of which is expressly represented in FIG. 1. Having the transmitters and the receivers enables transceivers 145, 120 and 150 to communicate bi-directionally with one another. Transceivers 145, 120 and 150 may each be configured as either a master device or a slave device, where communication is conducted in compliance with a communication protocol. PLC system 100 may include any number of transceivers, and it may also include discrete transmitters or discrete receivers.

Assume that transceiver 145 wishes to communicate with transceiver 120. Accordingly, transceiver 145 transmits a signal via outlet 110. The signal propagates through power line 115, and transceiver 120 receives the signal via outlet 125. Thus, transceiver 145 is an initiator of a transmission, and transceiver 120 is a target of the transmission. In many communication protocols, transceiver 120, in response to receiving the signal, transmits an acknowledge signal to transceiver 145 over power line 115. When transceiver 145 receives the acknowledge signal, transceiver 145 concludes that the communication with transceiver 120 is successful.

Communication signal frequencies, particularly frequencies above 1 megahertz (MHz), are susceptible to adverse effects caused by a complex impedance, i.e., a collective effect of resistance, capacitance and inductance, of electrical power network 105. Also, the effect of the complex impedance may differ in different parts of electrical power network 105.

For example, assume that transceiver 145 transmits a signal, i.e., a transmitted signal, at a frequency of 13.56 MHz. The transmitted signal will propagate through electrical power network 105, and may be received satisfactorily by transceiver 120, yet it may also be severely attenuated, e.g., −70 decibels (dB), at outlet 130 and consequently, not received by transceiver 150. Such attenuation at outlet 130 is due to destructive cancellation of two or more signals. Of these canceling signals, one is the transmitted signal from outlet 110 to outlet 130. The other signals, i.e., interference signals, are reflections from other electrical paths in electrical power network 105. Since electrical power network 105 is designed for 60 Hz current, 13.56 MHz signals will be reflected from locations where wiring branches terminate or connect to an appliance. The signals will be subject to different amounts of phase shift due to various inductance, resistance and capacitance values, i.e., complex impedance, distributed throughout electrical power network 105. When the phases and amplitudes of the signals combine at outlet 130 in a manner that cancels the transmitted signal, the transmitted signal is severely attenuated.

Thus, with a particular balance of cancellations, the attenuation is severe. However, if the complex impedance of electrical power network 105 is modified slightly, this balance is disturbed and the signal strength at outlet 130 increases substantially.

Electrical power network 105 may have various electrical appliances coupled to it, for example, a refrigerator or a light. The complex impedance of electrical power network 105 can be changed by switching an appliance off or on, by plugging an appliance into an outlet, or by removing an appliance from an outlet. A change of impedance at any point in electrical power network 105 can have an effect throughout electrical power network 105. Thus, the complex impedance of electrical power network 105 is not constant, but is instead, variable. Consequently, quality of communication between transceivers 145, 120 and 150 may at times be satisfactory, and at other times unsatisfactory.

Quality of communication may be gauged in any suitable manner. One technique for gauging quality is based on by a bit error rate (BER). If the BER is less than a threshold value, the quality is considered acceptable, otherwise, the quality is considered unacceptable. Another technique for gauging the quality is based on whether the communication is acknowledged by a receiver coupled to the electrical power network. For example, assume transceiver 145 transmits a message to transceiver 150. If the receiver in transceiver 150 acknowledges receipt of the message, the quality is considered to be acceptable, otherwise, the quality is unacceptable.

Communication over power lines, such as power line 115, typically uses carrier frequencies in the range of 1 MHz-40 MHz. In this channel of frequencies, many signal attenuations are due to standing wave cancellation. These attenuations appear as narrow (in frequency) and deep (in attenuation) when plotting attenuation versus frequency, see, for example, FIGS. 3 and 4. These deep cancellation nulls can occur at any frequency and to any depth, depending on conditions in power line, e.g., physical layout of the power line and the configuration of devices coupled to the power line. As mentioned above, an additional problem is that the frequency and depth of the nulls is likely to change with time.

Transceiver 145 includes components that enable transceiver 145 to deal with the aforementioned problems attributed to frequency nulls. More specifically, transceiver 145 includes a null shift circuit 135 and a processor 140.

Null shift circuit 135 is an impedance switching circuit for modifying the complex impedance of electrical power network 105. Processor 140 controls null shift circuit 135 to modify the complex impedance of electrical power network 105 to facilitate communication in electrical power network 105. Modifying the complex impedance, in turn, alters a characteristic of a null in electrical power network 105. The alteration can involve either or both of (a) reducing the depth of the null at its present frequency, or (b) causing the null to move to a different frequency. When communication is conducted in a particular signal frequency band, and the null occurs at the signal frequency band, reducing or moving the null will improve the quality of the communication in the signal frequency band.

In one aspect, processor 140 (a) advises transceiver 145 to transmit a message via electrical network 105, (b) controls null shift circuit 135 to modify the complex impedance of electrical power network 105, and (c) advises transceiver 145 to retransmit the message. Thus, transceiver 145 transmits a message a plurality of times, where electrical power network 105 is configured with a different complex impedance for each of the plurality of times. The retransmission of data can be done without determining whether the quality of communication is best at any particular complex impedance. Transmitting the message a plurality of times increases the chance that at least one transmission will be successful. However, the retransmission also decreases the overall rate of communication, but in some applications, a reduced rate of communications is acceptable.

In another aspect, processor 140 monitors communication in electrical power network 105 and determines a quality of the communication. If the quality is below an acceptable threshold, processor 140 controls null shift circuit 135 to modify the complex impedance of electrical power network 105. Processor 140 then determines whether the modification affected the quality of the communication. For example, assume transceiver 145 transmits a message to transceiver 150. If transceiver 145 does not receive an acknowledge from transceiver 150, processor 140 assumes there is a null at the communication frequency, and so, processor 140 controls null circuit 135 to modify the complex impedance. Transceiver 145 then retransmits the message, and processor 140 determines whether the retransmission is successfully acknowledged.

Null shift circuit 135 may be configured to selectively provide a plurality of values for modifying the complex impedance. Processor 140 may then control null shift circuit 135 to test the quality of communication in electrical power network 105 using the plurality of values, and determine which of the plurality of values yields the best level of quality. Processor 140 would then set null shift circuit 135 to provide the impedance value that yields the most favorable quality. For example, assume null shift circuit 135 may be set to provide either of impedances $Z_1$ or $Z_2$. Processor 140 controls null shift circuit 135 to provide impedance $Z_1$, and monitors the quality of communication. Assume that using impedance $Z_1$ yields a quality level of $Q_1$. Thereafter, processor 140 controls null shift circuit to provide impedance $Z_2$, monitors the quality of communication, and finds that using impedance $Z_2$ yields a quality of $Q_2$. Processor 140 then controls null shift circuit 135 to provide the impedance, $Z_1$ or $Z_2$, that yields the better quality, $Q_1$ or $Q_2$.

Additionally, processor 140 may evaluate the quality of communication involving different sets of devices in PLC system 100, and consequently determine that a first complex impedance yields a best result for a first set of devices, and that a second complex impedance yields a best result for a second set of devices. For example, processor 140 may find that communication between transceiver 145 and 120 is best when null shift circuit 135 provides impedance $Z_1$, and that communication between transceivers 145 and 150 is best when null shift circuit 135 provides impedance $Z_2$. Accordingly, during communications between transceiver 145 and 120, processor 140 controls null shift circuit 135 to provide impedance $Z_1$, and during communications between transceiver 145 and 150, processor 140 controls null shift circuit 135 to provide impedance $Z_2$.

Although null shift circuit 135 and processor 140 are represented as being located in transceiver 145, they may be located in any or all of transceivers 145, 120 and 150. For example, a transceiver 120 may receive a signal having errors (bit errors), and may nevertheless be able to successfully receive the signal by performing an error correction. However, transceiver 120 may nevertheless decide to change the complex impedance of electrical power network 105 in order to reduce bit errors.

Alternatively, null shift circuit 135 and processor 140 may reside in a receiver (not shown) that does not actively participate in the communications in electrical power network 105, but instead, monitors the communications between transceivers 145, 120 and 150, and modifies the complex impedance to yield the best communications performance. Such a receiver may modify the complex impedance in response to its sensing a degradation in communications, or it may periodically or randomly modify the complex impedance and evaluate the performance for various impedance values.

Null shift circuit 135 need not necessarily be located inside of any of transceivers 145, 120 or 150, nor inside of a receiver. Instead, it could be a stand-alone device, and it could also be located remotely from processor 140.

Processor 140 may be implemented in special-purpose hardware, that is, hardware designed for the specific purposes described herein, e.g., monitoring quality of communication and controlling null shift circuit 135. Alternatively, processor 140 may be implemented in software on a microcomputer having an associated memory (not shown) that contains instructions for controlling processor 140. Also, such instructions may be configured on a storage media 155 for subsequent loading into the memory of processor 140. Storage media 155 can be any conventional storage media such as a solid state memory, a magnetic tape, an optical storage media, a compact disk, or a floppy disk. Regardless of where the instructions are stored, when they are executed by processor 140, they provide a technical effect of facilitating communication in electrical power network 105. Whether processor 140 is implemented in hardware or software, it may be configured as a single module, or as a plurality of subordinate modules.

Figure 2A:
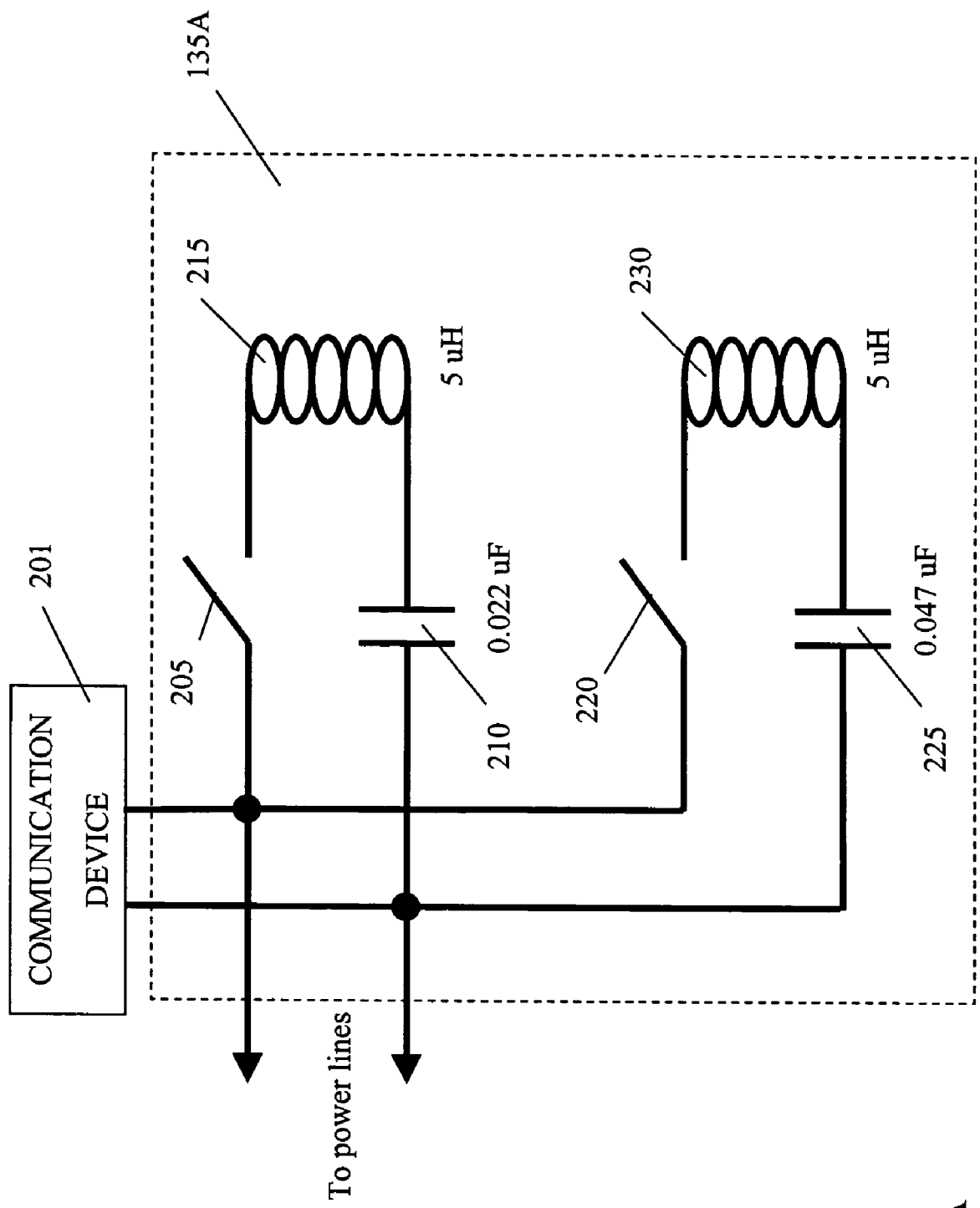
FIGS. 2A and 2B are schematic diagrams of exemplary embodiments of a null shift circuit.

FIG. 2A is a schematic diagram of a null shift circuit 135A, suitable for employment as null shift circuit 135. Null shift circuit 135A includes switches 205 and 220, capacitors 210 and 225, and inductors 215 and 230. Null shift circuit 135A is coupled to power line 115 and also to a communication port of a communications device 201, e.g., a transmitter or a receiver of transceiver 145. Capacitor 210 has a value of 0.022 microfarad (µF), capacitor 225 has a value of 0.047 µF, and inductors 215 and 230 each have a value of 5 microhenries (µH). Processor 140 (FIG. 1) controls switches 205 and 220 to modify the complex impedance of electrical power network 105 by changing a reactance across the conductors of power line 115.

Consider a $Circuit_0$ in which both of switches 205 and 220 are open. Capacitors 210 and 225, and inductors 215 and 230 are switched out of electrical power network 105. Thus, null shift circuit 135A may be regarded as being OFF. The complex impedance of electrical power network 105 is a function of conditions external to null shift circuit 135A. Designate this configuration of complex impedance as $Z_0$.

Consider a Circuit$_1$ in which switch 205 is closed and switch 220 is open. Inductor 215 and capacitor 210 are switched into electrical power network 105, and so, affect the complex impedance of electrical power network 105. Designate this configuration of complex impedance as $Z_1$.

Consider a Circuit$_2$ in which switch 205 is open and switch 220 is closed. Inductor 230 and capacitor 225 are switched into electrical power network 105, and so, affect the complex impedance of electrical power network 105. Designate this configuration of complex impedance as $Z_2$.

Consider a Circuit$_3$ in which both switches 205 and 220 are closed. All of capacitors 210 and 225, and inductors 215 and 230 are switched into electrical power network 105, and so, affect the complex impedance of electrical power network 105. Designate this configuration of complex impedance as $Z_3$.

Table 1 summarizes the four configurations of switches 205 and 220, and the resultant four complex impedances $Z_0$-$Z_3$. Complex impedances $Z_0$-$Z_3$ are different from one another. Processor 140 controls null shift circuit 135 to modify the complex impedance of electrical power network 105 by changing the complex impedance of electrical power network 105 from one of complex impedances $Z_0$-$Z_3$ to another of complex impedances $Z_0$-$Z_3$.

TABLE 1

| Switch 220 | Switch 205 | Complex Impedance |
|---|---|---|
| open | open | $Z_0$ |
| open | closed | $Z_1$ |
| closed | open | $Z_2$ |
| closed | closed | $Z_3$ |

Figure 2B:
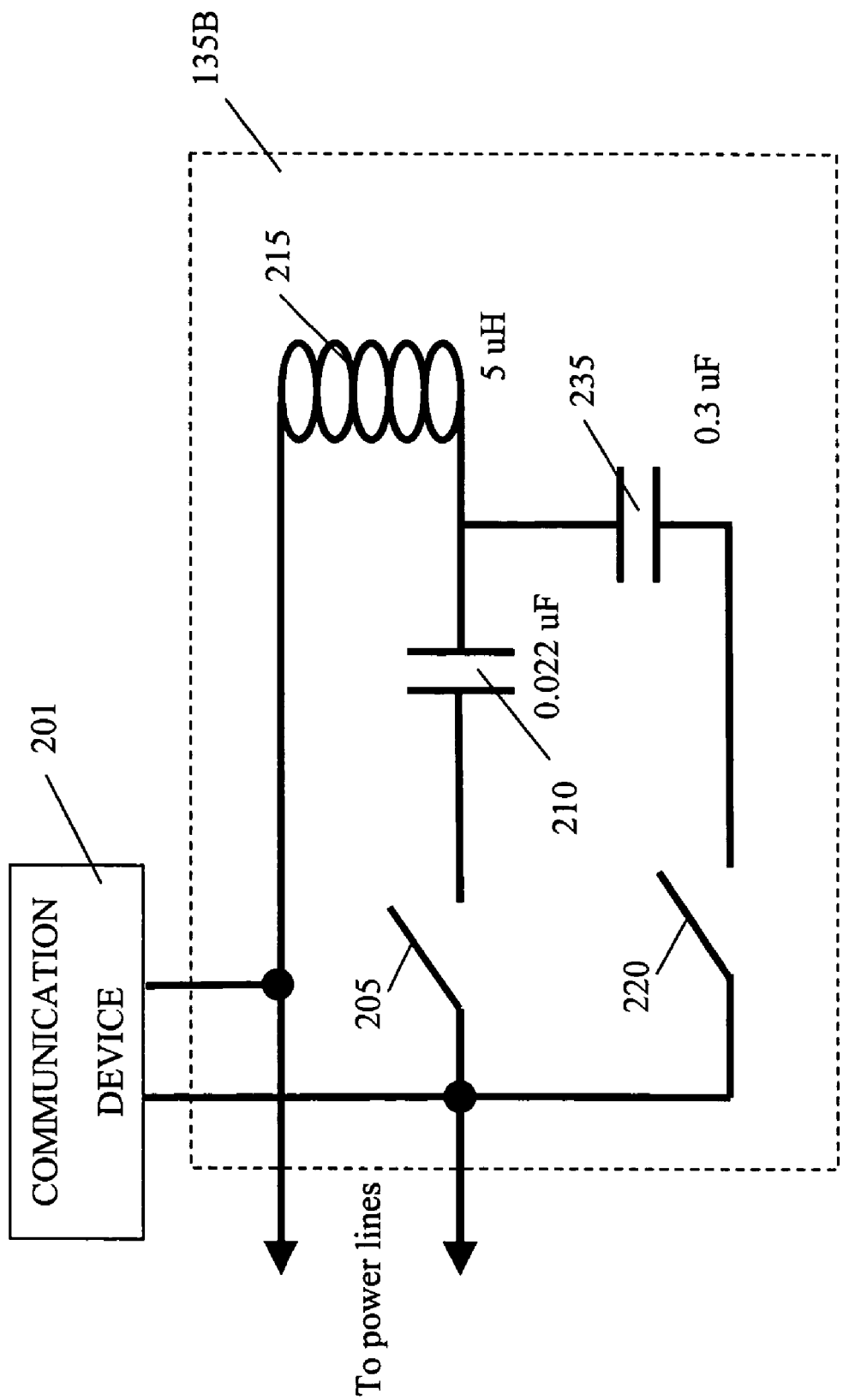

FIG. 2B is a schematic diagram of a null shift circuit 135B that may also be employed as null shift circuit 135. Null shift circuit 135B has a different topology than null shift circuit 135A, and does not include capacitor 225 and inductor 230, but instead includes a capacitor 235 having a value of 0.3 µF. Similarly to null shift circuit 135A, null shift circuit 135B can be controlled so that the complex impedance of electrical power network 105 can be set to one of four values.

The topologies of null shift circuits 135A and 135B and the values for capacitors 210, 225 and 235, and for inductors 215 and 230, are merely exemplary. Also, although null shift circuits 135A and 135B are shown as being able to configure electrical power network 105 with four complex impedances, null shift circuit 135 may be implemented to configure electrical power network 105 with any desired plurality of complex impedances. For example, in a basic implementation, null shift circuit 135 may be implemented to switch a single impedance in to, or out of, electrical power network 105, thus providing two configurations of complex impedance for electrical power network 105. Generally, null shift circuit 135 can be any circuit capable of modifying the complex impedance of electrical power network 105, and it may be configured of either active or passive components, or a combination thereof.

Figure 3:
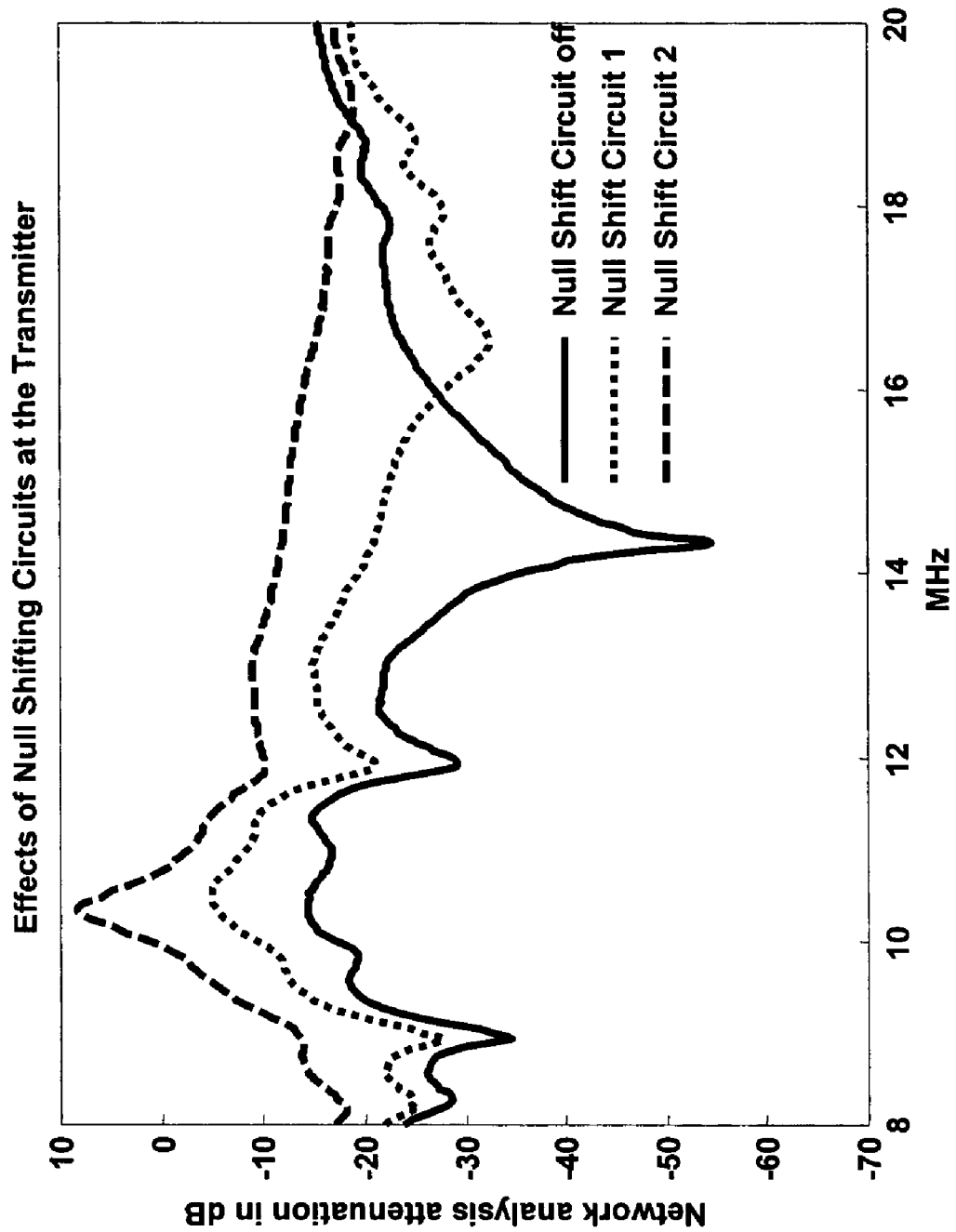
FIG. 3 is a graph showing exemplary effects on a null in a test case where a null shift circuit similar to that of FIG. 2A is employed at a transmitter.

FIG. 3 is a graph showing exemplary effects on a null in a test case where a null shift circuit similar to 135A is employed at a transmitter. The vertical axis of FIG. 3 is attenuation, and the horizontal axis is frequency. Assume a power line communication carrier frequency of 14.2 MHz. With the null shift circuit OFF, there is a null of about −55 dB at 14.2 MHz. When the null shift circuit is configured for Circuit$_1$, the attenuation at 14.2 MHz is about −20 dB, an improvement of about 35 dB. When the null shift circuit is configured for Circuit$_2$, the attenuation at 14.2 MHz is about −10 dB, an improvement of about 45 dB. In practice, actual effects will likely vary from those shown in FIG. 3 because each real-world electrical power network has its own unique combination of impedances.

Figure 4:
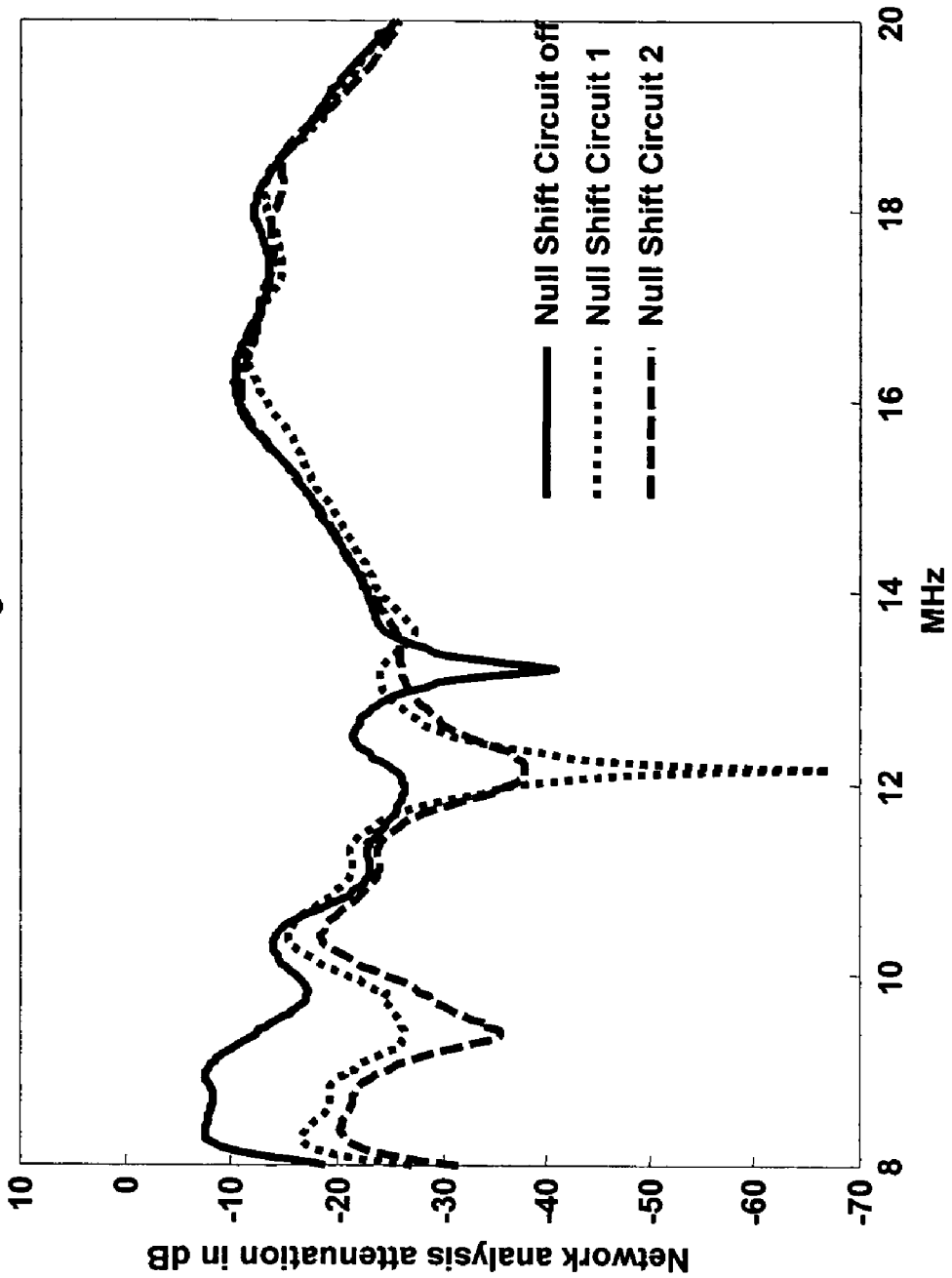
FIG. 4 is a graph showing exemplary effects on a null in a test case where a null shift circuit similar to that of FIG. 2A is employed at a receiver.

FIG. 4 is a graph showing exemplary effects on a null in a test case where a null shift circuit similar to 135A is employed at a receiver. The vertical axis of FIG. 4 is attenuation, and the horizontal axis is frequency. Consider possible communication frequencies of 12.2 MHz and 13.2 MHz. With the null shift circuit OFF, there is a null of about −25 dB at 12.2 MHz, and a null of about −40 dB at 13.2 MHz. When the null shift circuit is configured for Circuit$_1$, a null of about −68 dB occurs at about 12.2 MHz and the attenuation at 13.2 MHz is about −23 dB. When the null shift circuit is configured for Circuit$_2$, the attenuation at 12.2 MHz is about −37 dB, and the attenuation at 13.2 MHz is about −26 dB. As such, for the communication frequency of 12.2 MHz, the most favorable performance occurs with the null shift circuit turned OFF. However, for the communication frequency of 13.2 MHz, the most favorable performance occurs with Circuit$_1$. In practice, actual effects will likely vary from those shown in FIG. 4 because each real-world electrical power network has its own unique combination of impedances.

Several alternative scenarios are contemplated for employment of null shift circuit 135 and processor 140. (1) Actively changing PLC cancellation null depth or null frequency to allow signaling at a desired frequency by modifying the complex impedance of electrical power network 105. (2) Using a master communication device to modify the complex impedance of electrical power network 105 if no response is received from a slave unit. (3) Using a master communication device to modify the complex impedance of electrical power network 105 and monitor performance, and then using the impedance providing the best performance. (4) Using a slave communication device to periodically modify the complex impedance of electrical power network 105, and then using the impedance that provides the best performance. (5) Using an independent communication device to modify the complex impedance of electrical power network 105, periodically, randomly or intermittently, to improve communication between a separate master and slave device. These various scenarios may be employed by transmitters and receivers without necessarily designating them as masters or slaves.

It should be understood that various alternatives, combinations and modifications of the teachings described herein could be devised by those skilled in the art. The present invention is intended to embrace all such alternatives, modifications and variances that fall within the scope of the appended claims.

What is claimed is:

1. A method of facilitating communication in an electrical power network having a complex impedance, comprising:
    modifying said complex impedance of said electrical power network; and
    determining whether said modifying affected a quality of said communication.

2. The method of claim 1, wherein said modifying alters a characteristic of a null in said electrical power network.

3. The method of claim 1,
    wherein said communication is conducted in a signal frequency band, and
    wherein said modifying improves said quality in said signal frequency band.

4. The method of claim 1, wherein said modifying is performed in response to a determination that said quality is below an acceptable threshold.

5. The method of claim 1, wherein and said modifying and said determining are repeated for a plurality of values for said complex impedance, and wherein said method further comprises determining which of said plurality of values yields a best level for said quality.

6. The method of claim 1, wherein said method is employed by a device selected from the group consisting of a transmitter, a receiver, and a transceiver.

7. The method of claim 1, wherein said method is employed by a transceiver that failed to receive an acknowledgement of a message that said transceiver previously transmitted over said electrical power network.

8. The method of claim 1, wherein said quality is gauged by a bit error rate of said communication.

9. The method of claim 1, wherein said quality is gauged by whether said communication is acknowledged by a receiver coupled to said electrical power network.

10. A method of facilitating communication in an electrical power network having a complex impedance, comprising:
    determining a quality of communication in said electrical power network; and
    modifying said complex impedance of said electrical power network if said quality is below an acceptable threshold.

11. A method of facilitating communication in an electrical power network having a complex impedance, comprising:
    transmitting information via said electrical power network;
    determining a quality of communication of said transmitted information;
    modifying said complex impedance of said electrical power network based upon said determination; and
    retransmitting said information via said electrical power network.

12. An apparatus for facilitating communication in an electrical power network having a complex impedance, comprising:
    a circuit for modifying said complex impedance of said electrical power network; and
    a processor for determining whether said modifying affected a quality of said communication.

13. The apparatus of claim 12, wherein said modifying alters a characteristic of a null in said electrical power network.

14. The apparatus of claim 12,
    wherein said communication is conducted in a signal frequency band, and
    wherein said modifying improves said quality in said signal frequency band.

15. The apparatus of claim 12, wherein said modifying is performed in response to a determination that said quality is below an acceptable threshold.

16. The apparatus of claim 12, wherein and said modifying and said determining are repeated for a plurality of values for said complex impedance, and wherein said processor further comprises a module for determining which of said plurality of values yields a best level for said quality.

17. The apparatus of claim 12, wherein said apparatus is employed by device selected from the group consisting of a transmitter, a receiver, and a transceiver.

18. The apparatus of claim 12, wherein said apparatus is employed by a transceiver that failed to receive an acknowledgement of a message that said transceiver previously transmitted over said electrical power network.

19. The apparatus of claim 12, wherein said quality is gauged by a bit error rate of said communication.

20. The apparatus of claim 12, wherein said quality is gauged by whether said communication is acknowledged by a receiver coupled to said electrical power network.

21. A processor for facilitating communication in an electrical power network having a complex impedance, comprising:
    a module for determining a quality of communication in said electrical power network; and
    a module for controlling a circuit to modify said complex impedance of said electrical power network if said quality is below an acceptable threshold.

22. A processor for facilitating communication in an electrical power network having a complex impedance, comprising:
    a module for advising a transmitter to transmit information via said electrical power network;
    a module for determining quality of communication of said transmitted information;
    a module for controlling a circuit to modify said complex impedance of said electrical power network based upon said determination; and
    a module for advising said transmitter to retransmit said information.

23. A storage medium that contains instructions for controlling a processor for facilitating communication in an electrical power network having a complex impedance, comprising:
    instructions for controlling said processor to determine a quality of communication in said electrical power network; and
    instructions for controlling said processor to control a circuit to modify said complex impedance of said electrical power network if said quality is below an acceptable threshold.

24. A storage medium that contains instructions for controlling a processor for facilitating communication in an electrical power network having a complex impedance, comprising:
    instructions for controlling said processor to advise a transmitter to transmit information via said electrical power network;
    instructions for determining quality of communication of said transmitted information;
    instructions for controlling said processor to control a circuit to modify of said electrical power network said complex impedance based upon said determination; and
    instructions for controlling said processor to advise said transmitter to retransmit said information.

* * * * *

UNITED STATES PATENT AND TRADEMARK OFFICE
CERTIFICATE OF CORRECTION

PATENT NO.        : 7,493,100 B2
APPLICATION NO.   : 10/685868
DATED             : February 17, 2009
INVENTOR(S)       : Welles, II et al.

It is certified that error appears in the above-identified patent and that said Letters Patent is hereby corrected as shown below:

In Column 9, Line 1, in Claim 5, after "wherein" delete "and".

In Column 9, Line 54, in Claim 16, after "wherein" delete "and".

Signed and Sealed this

Twenty-fifth Day of August, 2009

David J. Kappos
*Director of the United States Patent and Trademark Office*